May 3, 1938.  H. BANY ET AL  2,116,379
CIRCUIT BREAKER CONTROL SYSTEM
Filed March 18, 1937
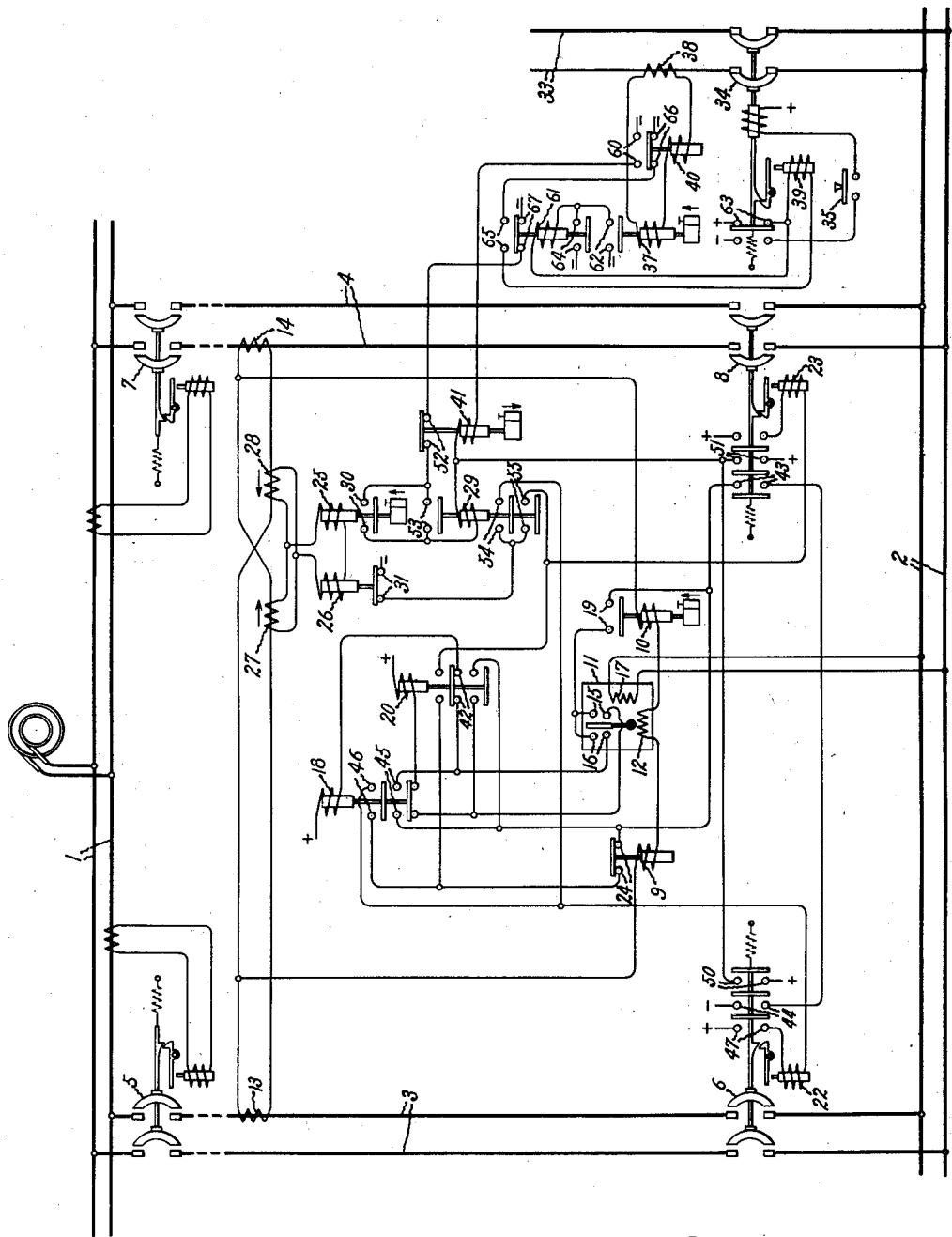
Inventors:
Herman Bany,
William N. Gittings,
by Harry E. Dunham
Their Attorney.

Patented May 3, 1938

2,116,379

UNITED STATES PATENT OFFICE 2,116,379

CIRCUIT BREAKER CONTROL SYSTEM

Herman Bany, Lansdowne, and William N. Gittings, Upper Darby, Pa., assignors to General Electric Company, a corporation of New York Application March 18, 1937, Serial No. 131,663

12 Claims. (Cl. 175—294)

Our invention relates to circuit breaker control systems and particularly to a system for controlling the opening of a circuit breaker having a relatively low current interrupting capacity which is connected in series with another circuit breaker having a relatively high current interrupting capacity so that the circuit breaker having the relatively low current interrupting capacity is opened only under abnormal current conditions which are within its interrupting capacity and is prevented from opening until after the other circuit breaker has opened when an abnormal condition occurs which causes a current to flow through the circuit breakers in excess of the interrupting capacity of the circuit breaker having the relatively low current interrupting capacity. One object of our invention is to provide an improved arrangement for controlling the opening of such a breaker having a relatively low current interrupting capacity.

Another object of our invention is to provide in a system in which a load bus is supplied with current from one or more supply circuits and supplies current to one or more load currents an arrangement for selectively controlling circuit breakers in the supply and load circuits so that a fault on a load circuit effects the disconnection of the faulty load circuit without effecting the disconnection of any of the supply circuits from the load bus.

Our invention will be better understood from the following description when taken in connection with the accompanying drawing, the single figure of which diagrammatically illustrates a circuit breaker control system embodying our invention, and its scope will be pointed out in the appended claims.

Referring to the accompanying drawing, 1 represents a supply bus which is connected to a load bus by two parallel feeders 3 and 4. In order to simplify the disclosure, single phase circuits have been shown, but it will be obvious to those skilled in the art that in actual practice the buses and feeders may be polyphase circuits. The feeder 3 is connected to the supply bus 1 by a suitable overload circuit breaker 5 and to the load bus 2 by a circuit breaker 6. The feeder 4 is similarly connected to the supply bus 1 by a suitable overload circuit breaker 7 and to the load bus 2 by a circuit breaker 8. The current interrupting capacities of the circuit breakers 6 and 8 are low relatively to the current interrupting capacities of the overload circuit breakers 5 and 7. Therefore it is desirable that the circuit breakers 6 and 8 should open only under current conditions which do not exceed their respective current interrupting capacities. In order to accomplish this result we provide an arrangement which effects immediately the selective opening of the circuit breaker 6 or 8 when a fault occurs on the associated feeder and the fault current through the circuit breaker in the faulty feeder is within the current interrupting capacity of this circuit breaker and for preventing the selective opening of the circuit breaker in the faulty feeder as long as the fault current exceeds the current interrupting capacity thereof. By preventing the opening of the circuit breakers 6 and 8 under these abnormal current conditions, the overload circuit breakers 5 and 7 open to disconnect the faulty feeder from the supply bus 1 before the other circuit breaker having a relatively low current interrupting capacity in the faulty feeder opens.

In the particular arrangement shown in the drawing, this result is accomplished by means of the current relays 9 and 10 and the directional relay 11 which has a voltage winding 17 connected to a suitable source of voltage such as the load bus 2 and a current winding 12 that is connected in series with the windings of the relays 9 and 10 to the secondary windings of the current transformers 13 and 14, the primary windings of which are respectively connected in series relation with the feeders 3 and 4. The secondary windings of the transformers 13 and 14 are connected for circulating currents and the current windings of the relays 9, 10, and 11 are connected in a well known manner to the secondary windings of the current transformers 13 and 14 so that the relays are energized in response to the difference between the currents supplied to the load bus 2 through the feeders 3 and 4 and so that the current through these relay windings is in one direction when the feeder 3 is supplying more than a predetermined portion of the total current and in the opposite direction when the feeder 3 is supplying less than this predetermined portion of the total current. The relay 10 is designed in any suitable manner so that it operates when the difference in the currents through the feeders 3 and 4 exceeds a predetermined value and the relay 9 is designed in any suitable manner so that it operates when the difference in the currents through the feeders 3 and 4 exceeds a higher predetermined value. Also the relay 10 is designed so that it has a longer operating time than the relay 9. Therefore when the difference in currents through the feeders 3 and 4 is sufficient to operate the relay 9, this relay will operate to open its contacts 24 before the relay 10 operates to close its contacts 19. The direction of current flow through the current winding 12 of the directional relay 11 determines which of the two sets of contacts 15 and 16 of the relay 11 are closed. When the feeder 3 is supplying more than its normal share of the total current, the direction of current flow through the relay winding 12 is such as to cause the relay contacts 15 to be closed and when the feeder 4 is supplying more than its normal share of the total current, the direction of current flow through the relay winding 12 is such as to cause the relay contacts 16 to be closed.

The relays 10 and 11 have associated therewith an auxiliary relay 18 which is energized when the contacts 16 of relay 11 and the contacts 19 of relay 10 are simultaneously closed and a second auxiliary relay 20, which is energized when the contacts 15 of the relay 11 and the contacts 19 of relay 10 are simultaneously closed. The relays 18 and 20 respectively complete through contacts 24 of relay 9 energizing circuits for the trip coils 22 and 23 of the circuit breakers 6 and 8.

We also provide an arrangement for effecting immediately the opening of the circuit breakers 6 and 8 in response to a fault on the load bus 2 when the total current supplied by the feeders 3 and 4 exceeds a predetermined value which is less than the current interrupting capacity of either of these breakers and for preventing these circuit breakers from opening when the total current supplied to the fault on the bus 2 exceeds this predetermined value. This result is accomplished in the arrangement shown in the drawing by the two current relays 25 and 26, which are connected to the secondary windings of the current transformers 27 and 28, the primary windings of which are respectively connected in series relation with the secondary windings of the current transformers 13 and 14. The secondary windings of the current transformers 27 and 28 are connected in opposition to each other and the windings of relays 25 and 26 are so connected to these transformer secondary windings that the relays are energized by the sum of the secondary currents of the transformers 27 and 28 and consequently are energized in response to the total current supplied to the load bus 2, whether both or only one of the feeders is in service. The relay 25 is designed so that it operates when the total current supplied to the load bus exceeds a predetermined value and the relay 26 is designed so that it operates when the total current supplied to the load bus exceeds a higher predetermined value. Also the relay 25 is designed so that it has a longer operating time than the relay 26. Associated with the relay 25 is an auxiliary relay 29 which is energized in response to the operation of the relay 25 to complete through the normally closed contacts 31 of the relay 26 an energizing circuit for the trip coil 22 if the circuit breaker 6 is closed and an energizing circuit for the trip coil 23, if the circuit breaker 8 is closed.

The load bus 2 is shown as supplying current to a load circuit 33 through an overload circuit breaker 34 of relatively low current interrupting capacity which is provided with a suitable manual control switch 35 for effecting the closing of the circuit breaker when it is open. If so desired, the switch 35 may be replaced by automatic reclosing means of any suitable type, examples of which are well known in the art. For effecting the opening of the circuit breaker 34 in response to a fault on the load circuit 33, we provide an overcurrent relay 37 which is connected in series relation with the load circuit 33 by means of a current transformer 38. When the current supplied to the load circuit 33 exceeds a predetermined value, the relay 37 operates to complete an energizing circuit for a control relay 61 which in turn, when energized, completes an energizing circuit for a trip coil 39 of the circuit breaker 34.

In order to prevent a severe fault on the load circuit 33 from effecting the opening of the circuit breakers 6, 8, and 34 in case the fault causes current to flow through the circuit breakers in excess of their respective current interrupting capacities, we provide an arrangement which prevents the relay 25 from effecting the energization of the control relay 29 and the relay 61 from effecting the energization of the trip coil 39 while the fault current in the load circuit 33 exceeds a predetermined value which is greater than the value required to operate the relay 37. In the particular arrangement shown in the drawing, we provide a relay 40 which is connected in series relation with the overcurrent relay 37 and which is arranged to open contacts in the energizing circuit of the trip coil 39 and to complete an energizing circuit for an associated control relay 41 whenever the current in the load circuit 33 exceeds a predetermined value. The relay 41 controls contacts in the energizing circuit of the relay 29 so that this relay 29 is prevented from being energized while the relay 41 is energized and for a predetermined time after the relay 41 is deenergized. The relay 41 is designed in any suitable manner so that it has a time delay dropout and so that its operating time when energized is less than the operating time of the relay 25 in order that the relay 41 may open its contact 52 before the relay 25 can close its contacts 30 and effect the energization of the relay 29 when a fault occurs on the load circuit 33.

The operation of the arrangement shown in the drawing is as follows: It will be assumed that with all of the circuit breakers closed a fault occurs on one of the feeders, such for example as feeder 3. The current supplied to this fault on feeder 3 through the circuit breaker 5 effects the opening of the circuit breaker 5 to disconnect the feeder 3 from the supply bus 1. The current supplied to the fault through the feeder 4 and the circuit breaker 6 effects the operation of the relay 10 and the closing of the contacts 16 of relay 11 so that a circuit is completed for relay 18 from the positive terminal of the control circuit, winding of relay 18, contacts 42 of relay 20, contacts 16 of relay 11, contacts 19 of relay 10, contacts 43 of circuit breaker 8, and contacts 44 of circuit breaker 6. By closing its contacts 45, relay 18 completes a shunt circuit around the contacts 16 of relay 11 and contacts 19 of relay 10 in its own energizing circuit. If the fault on the feeder 3 is not severe enough to cause the relay 9 to open its contacts 24, the closing of the contacts 46 of relay 18 completes an energizing circuit for the trip coil 22 from the positive terminal of the control circuit through the auxiliary contacts 47 on the circuit breaker 6, winding of trip coil 22, contacts 46 of relay 18, contacts 24 of relay 9, auxiliary contacts 43 of circuit breaker 8, auxiliary contacts 44 on circuit breaker 6 to the negative terminal of the control circuit. The energization of the trip coil 22 effects the opening of the circuit breaker 6. If the fault is severe enough to cause the relay 9 to open its contacts 24, these contacts will open before the relay 18 becomes energized and therefore the energizing circuit of the trip coil 22 is maintained open until both of the overload circuit breakers 5 and 7 have opened and the faulty current has decreased to a value to allow the relay 9 to reclose its contacts 24.

In case a fault occurs on the feeder 4, the relays 10 and 11 operate in similar manner to effect the energization of the control relay 20 which in turn completes an energizing circuit for the trip coil 23 to open the circuit breaker 8 when the contacts 24 of the relay 9 are closed.

When a fault occurs on the bus 2, the relay 25 operates if the total current supplied to the bus 2, irrespective of the number of feeders in service, exceeds a predetermined amount. Relay 25, by closing its contacts 30, completes an energizing circuit for the relay 29 from the positive terminal of the control circuit through the parallel connected auxiliary contacts 50 and 51 of the circuit breakers 6 and 8, respectively, winding of relay 29, contacts 30 of relay 25, contacts 52 of relay 41 and contacts 67 of relay 61 to the negative side of the control circuit. By closing its contacts 53, relay 29 completes a shunt circuit around the contacts 30 of relay 25. If the fault is not severe enough to effect the operation of the relay 26, the closing of the contacts 54 and 55 of relay 29 respectively completes energizing circuits for the trip coils 22 and 23, thereby effecting the opening of the circuit breakers 6 and 8. However, if the fault is severe enough to effect the operation of relay 26, this relay, by opening its contacts 31 in the energizing circuits for the trip coils 22 and 23 before the relay 29 becomes energized, thereby prevents the circuit breakers 6 and 8 from being opened until after both of the overload circuit breakers 5 and 7 have opened and the total current supplied to the load bus 2 has decreased to a sufficient value to allow the relay 26 to reclose its contacts 31.

When a fault occurs on the load circuit 33, the overload relay 37 operates and the closing of its contacts 62 completes an energizing circuit for relay 61 through contacts 63 on the circuit breaker 34. The closing of contacts 64 of relay 61 completes a shunt circuit around contacts 62 of relay 37. The closing of the contacts 65 of relay 61 completes an energizing circuit for the trip coil 39 if the fault current is not sufficient to operate relay 40 so that the circuit breaker 34 is opened to disconnect the load circuit 33 from the load bus 22. The opening of contacts 67 prevents the relay 29 from being energized to effect the tripping of either the circuit breaker 6 or 8.

If the fault on the load circuit 33 is severe enough to cause a fault current to flow which is in excess of the current interrupting capacities of the circuit breakers 34, 8, and 6, it is also desirable that these circuit breakers be prevented from opening under such excessive current condition in order that the circuit breakers 5 and 7 of high current interrupting capacity may interrupt the excessive fault current. This result is accomplished by setting the relay 40 so that it responds only to such a predetermined abnormal value of current, which is a higher value, than is required to operate relay 37. The opening of contacts 66 of relay 40 in the circuit of the trip coil 39 prevents the circuit breaker 34 from being opened when the relay 61 operates, due to the fault and the closing of contacts 60 of relay 40 completes an energizing circuit for the control relay 41 if either the circuit breaker 6 or the circuit breaker 8 is closed. Relay 41, by opening its contacts 52, interrupts the circuit of relay 29. Therefore, until the fault current in the load circuit 33 decreases to a sufficiently low value to permit the relay 40 to return to its normal position, the circuit breakers 6, 8, and 34 are prevented from being automatically tripped. Consequently, the circuit breakers 5 and 7 open to disconnect the load bus 2 from the supply bus 1.

When the load bus 2 is disconnected from the supply bus 1, the amount of fault current is reduced so that the relay 40 opens its contacts 60 and closes its contacts 66, thereby completing an energizing circuit for the trip coil 39 to effect the opening of the circuit breaker 34 so as to disconnect the faulty load circuit 33 from the load bus. The opening of contacts 60 of relay 40 effects the deenergization of relay 41, but due to its slow dropout, it does not close its contacts 52 in the circuit of relay 29 until after relay 25 has opened its contacts 30. Therefore, neither of the circuit breakers 6 and 8 is opened by a severe fault on the load circuit 33.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent of the United States is:

1. In combination, a supply bus, a load bus, a plurality of feeders interconnecting said buses, an individual overload circuit breaker having a relatively high current interrupting capacity connecting each feeder to said supply bus, another circuit breaker in each feeder connecting it to said load bus and having a lower current interrupting capacity than the associated overload circuit breaker, and means responsive to a fault on either feeder for selectively effecting the immediate opening of the circuit breaker between the faulty feeder and the load bus if the fault current in the faulty feeder is below the current interrupting capacity thereof and for effecting the opening of the circuit breaker between the faulty feeder and the load bus only after said overload circuit breakers of relatively high current interrupting capacity in all of the feeders have opened if the fault current in the faulty feeder is above the current interrupting capacity of the circuit breaker connecting the faulty feeder to the load bus.

2. In combination, a supply bus, a load bus, a plurality of feeders interconnecting said buses, an overload circuit breaker having a relatively high current interrupting capacity connecting each feeder to said supply bus, another circuit breaker in each feeder connecting it to said load bus and having a lower current interrupting capacity than the associated overload circuit breaker, means responsive to a fault on said load bus for effecting the immediate opening of all of the circuit breakers between the feeders in service and the load bus when the total fault current irrespective of the number of feeders in service exceeds a predetermined value which is less than the current interrupting capacity of one of said last mentioned circuit breakers and for effecting the opening of said circuit breakers between the feeders in service and the load bus only after the opening of all of the overload circuit breakers of relatively high current interrupting capacity in the feeders in service when the total fault current irrespective of the number of feeders in service exceeds a predetermined value which is greater than the current interrupting capacity of one of the circuit breakers connecting a feeder to the load bus.

3. In combination, a supply bus, a load bus, a plurality of feeders interconnecting said buses, an overload circuit breaker having a relatively high current interrupting capacity connecting each feeder to said supply bus, another circuit breaker in each feeder connecting it to said load bus and having a lower current interrupting capacity than the associated overload circuit breaker, and means responsive to the total current supplied by said feeders for effecting the immediate opening of all of the closed circuit breakers connecting the feeders in service to the load bus when the total current irrespective of the number of feeders in service exceeds a predetermined value and is less than the current interrupting capacity of any of said last-mentioned circuit breakers.

4. In combination, a supply bus, a load bus, a plurality of feeders interconnecting said buses, an overload circuit breaker having a relatively high current interrupting capacity connecting each feeder to said supply bus, another circuit breaker in each feeder connecting it to said load bus and having a lower current interrupting capacity than the associated overload circuit breaker, means responsive to the total current supplied by said feeders for effecting the immediate opening of all of the closed circuit breakers connecting the feeders in service to the load bus when the total current irrespective of the number of feeders in service exceeds a predetermined value and is less than the current interrupting capacity of any of said last mentioned circuit breakers, and means responsive to the total current supplied by said feeders for preventing the operation of said first mentioned means while the total current through the feeders in service exceeds a second predetermined value which is greater than the current interrupting capacity of one of said last mentioned circuit breakers.

5. In combination, a supply bus, a load bus, a plurality of feeders interconnecting said buses, an overload circuit breaker having a relatively high current interrupting capacity connecting each feeder to said supply bus, another circuit breaker in each feeder connecting it to said load bus and having a lower current interrupting capacity than the associated overload circuit breaker, a current transformer in each feeder, two relays connected to said transformers so that independently of the number of feeders in service each relay is energized in accordance with the total current being supplied to the load bus, one of said relays having a relatively slow time of operation and being responsive to one predetermined value of totalized current and the other of said relays having a relatively fast time of operation and being responsive to a higher predetermined value of totalized current, means responsive to the operation of said one of said relays for effecting the immediate operation of all of the circuit breakers between the feeders in service and the load bus, and means responsive to the operation of other of said relays for preventing the operation of said first mentioned means until after the opening of said overload circuit breakers in all of the feeders in service.

6. In combination, a supply bus, a load bus, a plurality of feeders interconnecting said buses, an overload circuit breaker having a relatively high current interrupting capacity connecting each feeder to said supply bus, another circuit breaker in each feeder connecting it to said load bus and having a lower current interrupting capacity than the associated overload circuit breaker, a current transformer in each feeder, a relay connected to said transformers so that independently of the number of feeders in service said relay is energized in accordance with the total current being supplied to the load bus, said relay being responsive to a predetermined value of totalized current which is less than the current interrupting capacity of any of said circuit breakers connecting a feeder to the load bus, and means responsive to the operation of said relay for effecting the opening of all of the circuit breakers between the feeders in service and the load bus.

7. In combination, a supply bus, a load bus, a plurality of feeders interconnecting said buses, an overload circuit breaker having a relatively high current interrupting capacity connecting each feeder to said supply bus, another circuit breaker in each feeder connecting it to said load bus and having a lower current interrupting capacity than the associated overload circuit breaker, a current transformer in each feeder, two relays connected to said transformers so that each relay is energized in response to the difference in the currents flowing through said feeders to said load bus, one of said relays having a relatively slow operating time and being responsive to a predetermined amount of current difference and the other of said relays having a relatively fast operating time and being responsive to a higher value of current difference, a directional relay having a current winding connected to said transformers so that the direction of current flow through said current winding varies in accordance with the relative amounts of current being supplied through said feeders to said load bus, means jointly controlled by said directional relay and said one of said relays for selectively effecting the immediate opening of the circuit breaker in a faulty feeder, and means controlled by the other of said relays for preventing the opening of the circuit breaker in a faulty feeder until the overload circuit breakers in the parallel feeder have opened.

8. In combination, a supply bus, a load bus, two parallel feeders interconnecting said buses, a circuit breaker in each feeder, a current transformer in each feeder, two relays connected to said transformers so that each relay is energized in response to the difference in the currents flowing through said feeders to said load bus, one of said relays having a relatively slow operating time and being responsive to one predetermined value of current difference and the other of said relays having a relatively fast operating time and being responsive to a higher value of current difference, a directional relay having a current winding connected to said transformers so that the direction of current flow through said current winding varies in accordance with relative amounts of current being supplied through said feeders to said load bus, means jointly controlled by said directional relay and said one of said relays for selectively effecting the immediate opening of the circuit breaker in the faulty feeder, and means controlled by said other of said relays for preventing said jointly controlled means from effecting the immediate opening of a circuit breaker in a faulty feeder if the fault current is sufficient to effect the operation of said other of said relays.

9. In combination, a supply bus, a load bus, a feeder interconnecting said buses, an overload circuit breaker connecting said feeder to said supply bus, a circuit breaker connecting said feeder to said load bus, means responsive to the current flow through said feeder for effecting the opening of said circuit breaker between said feeder and load bus when the current flow through said feeder exceeds a predetermined value, a load circuit connected to said load bus, a circuit breaker in said load circuit, means responsive to a predetermined current flow through said load circuit for effecting the opening of the circuit breaker in said load circuit, and means responsive to a predetermined higher value of current flow through said load circuit for preventing said feeder current responsive means from effecting the opening of said circuit breaker between said feeder and load bus.

10. In combination, a supply bus, a load bus, a plurality of feeders interconnecting said buses, an overload circuit breaker in each feeder for connecting it to said supply bus and having a relatively high current interrupting capacity, another circuit breaker in each feeder for connecting it to said load bus and having a relatively low current interrupting capacity, means responsive to the total current supplied by said feeders for effecting the opening of all of the closed circuit breakers connecting the feeders in service to said load bus when said total current reaches a predetermined value, a load circuit connected to said load bus, a circuit breaker in said load circuit, means responsive to a predetermined current flow through said load circuit for effecting the opening of the circuit breaker in said load circuit, and means responsive to a predetermined higher current flow through said load circuit for preventing said total current responsive means from effecting the opening of the circuit breakers connecting the feeders in service to the load bus.

11. In combination, a supply bus, a load bus, a feeder interconnecting said buses, an overload circuit breaker connecting said feeder to said supply bus, a circuit breaker connecting said feeder to said load bus, means responsive to the current flow through said feeder for effecting the opening of said circuit breaker between said feeder and load bus when the current flow through said feeder exceeds a predetermined value, a load circuit connected to said load bus, a circuit breaker in said load circuit, means responsive to a predetermined current flow through said load circuit for effecting the opening of the circuit breaker in said load circuit, and means responsive to a predetermined higher value of current flow through said load circuit for preventing said feeder current responsive means from effecting the opening of said circuit breaker between said feeder and load bus and for preventing the opening of said circuit breaker in said load circuit until the current in said load circuit decreases below a predetermined value.

12. In combination, a supply bus, a load bus, a feeder interconnecting said buses, an overload circuit breaker connecting said feeder to said supply bus, a circuit breaker connecting said feeder to said load bus, means responsive to the current flow through said feeder for effecting the opening of said circuit breaker between said feeder and load bus when the current flow through said feeder exceeds a predetermined value, a load circuit connected to said load bus, a circuit breaker in said load circuit, means responsive to a predetermined current flow through said load circuit for effecting the opening of the circuit breaker in said load circuit, and means responsive to a predetermined higher value of current flow through said load circuit for effecting only the opening of said overload circuit breaker and the subsequent opening of the circuit breaker in the load circuit.

HERMAN BANY.
WILLIAM N. GITTINGS.